2,728,806

PHOSPHORUS MODIFIED HALOGENATED HYDROCARBONS

Rupert C. Morris, Berkeley, and John L. Van Winkle, San Lorenzo, Calif., assignors to Shell Development Company, Emeryville, Calif., a corporation of Delaware No Drawing. Application April 27, 1953, Serial No. 351,502

3 Claims. (Cl. 260—772)

This invention relates to new and useful products containing both phosphorus and halogen atoms and to the method of their preparation. More particularly, the invention relates to mixtures of novel polyhalogenated hydrocarbons in which a part of the halogen has been replaced by certain esters of phosphonic or phosphinic acids, and to the preparation of these new products.

Broadly stated, the invention consists of novel products of the reaction between mixtures of high molecular weight, polyhalogenated hydrocarbons of essentially saturated nature and neutral esters of phosphorous acids, or phosphonous acids. These products have been prepared and are here described for the first time. The invention relates to the conception and preparation of these reaction products which broadly described constitute mixtures of high molecular weight hydrocarbons in which a substantial fraction of the hydrogen atoms have been replaced by halogen atoms, and in which a further substantial fraction of the remaining hydrogen atoms have been replaced by phosphono or phosphinico groups. The phosphono group has the structure

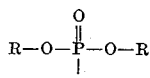

and the phosphinico group has the structure

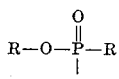

In these structures, the symbol R represents a hydrogen atom or a hydrocarbon radical.

The mixtures of high molecular weight polyhalogenated hydrocarbons used as one of the initial reactants in the preparation of the novel compounds comprise those materials known to the art as halowaxes and halorubbers and consist of what are essentially mixtures of halogen-substituted saturated hydrocarbons containing from about 14 to about 44 carbon atoms per molecule, and which contain from about 20% to about 85% halogen by weight.

The polyhalogeno-polyphosphono (or polyphosphinico) hydrocarbons of the invention have a halogen content of from about 10% to about 50% by weight and a phosphorus content of from about 1% to about 10% by weight. Compounds having a halogen content from about 15% to about 25% and a phosphorus content from about 2% to about 8% by weight have been found to be particularly desirable.

The mixtures of polyhalogeno-polyphosphono high molecular weight hydrocarbons and polyhalogeno-polyphosphinico high molecular weight hydrocarbons of this invention are prepared by reacting the halowax or halorubber with certain ester derivatives of trivalent phosphorus, namely, neutral esters of phosphorous acid or of phosphonous acid, such as trialkyl phosphites, alkali metal dialkyl phosphites, dialkyl alkanephosphonites or dialkyl phosphonites, preferably in a suitable inert solvent. The reaction is effected by refluxing the reactants for a substantial period of itme. In this reaction, the trivalent phosphorus compound apparently is converted to a corresponding pentavalent phosphorus compound and each molecule of the compound replaces a halogen atom on the polyhalogenated hydrocarbon.

In the preferred method for preparing the novel compounds of the invention, the phosphite or phosphonite is dissolved in a suitable neutral solvent, such as toluene or xylene, which is not reactive with the other components of the reaction mixture. To this solution is added the halowax or halorubber. This mixture is stirred well and then is refluxed at atmospheric pressure within the temperature range of from about 50° C. to about 150° C. The temperature range of from about 95° C. to about 120° C. is preferred for the reaction of the halowax and ester, while in case of the halorubber-ester reaction, the preferred temperature range is from about 100° C. to 135° C.

Though the reaction is normally substantially complete in about 24 hours, somewhat longer periods of refluxing can be employed without harmful results. The time required for the production of the compounds of the invention varies with the particular reactants used and the degree of reaction—e. g., the degree of replacement of the halogen in the halowax or halorubber by the phosphono or phosphinico radical—desired. In general, it has been found that the desired degree of replacement is obtained in from about 18 to about 30 hours. In some cases the desired degree of reaction has been obtained in 10 hours, while other cases have required as much as 72 hours.

Where the phosphorus ester employed contains no alkali metal, upon commencement of the reaction and while the reaction is in progress, an organic halide, formed by union of an alcohol radical of the phosphorus reactant with halogen of the halowax or halorubber, is evolved. Such organic halide advantageously is continuously volatilized from the reaction mixture and withdrawn from the system as formed, as by conducting the reaction at boiling in a vessel equipped with a fractionating column and continuously fractionating the evolved organic halide from the vapors. The extent of reaction may be followed by collecting and measuring the amount of the evolved organic halide. Ordinarily the heating will be continued until reaction stops as judged by cessation of the evolution of the organic halide, although, of course, the reaction may be interrupted at an earlier time if desired.

At the end of the refluxing period, the reaction mixture is cooled to room temperature. The subsequent procedure then depends upon the type of reactants employed.

(1) When the initial reactants are either a halowax or a halorubber and an alkali metal diester phosphite, the mixture following reaction contains the polyhalogenopolyphosphono-hydrocarbon and an alkali metal halide. Since the substituted hydrocarbon is not hydrolyzed by water, the metal halide can be separated from the hydrocarbon by thoroughly washing the reaction products mixture with water. The organic solvent is then removed by flash distillation. The crude product is then refluxed for a short period (1 to 4 hours) with from about one-half to two times its weight of a one normal solution of sodium hydroxide to remove any free acid and any easily hydrolyzable impurities. The mixture is then allowed to stand until the aqueous and organic phases separate; then the aqueous phase is removed. This procedure gives a substantially pure product.

(2) Where the initial reactants are either a halowax or a halorubber and an ester of phosphorus containing no alkali metal, the reaction products mixture contains the substituted hydrocarbon and some organic halide. These products are separated by distillation and the crude substituted hydrocarbon purified as indicated under (1) above.

Whatever method is employed for forming the compounds of the present invention, there should be employed from about 0.5 mol to about 5.0 gram-mols of the phosphorus ester to every gram-atom of halogen present in the reaction theatre; preferably the ratio should lie in the range of from about 0.7 gram-mol to about 2 gram-mols of the phosphorus ester per gram-atom of halogen. As long as these reactant proportions are employed, the concentration of the reactants in the solvent-reaction solution may be varied within relatively wide limits. The practical limits of the concentration of the reactants in the solvent are determined by the relative solubility of the initial reactants and the reaction products in the particular solvent employed.

The solvent used may be any solvent which satisfies the following requirements:

(1) The solvent must be inert as to the reactants and reaction products; and
(2) All the reactants and reaction products must be soluble in some substantial degree in the solvent.

Typical examples of the solvent which may be used include: toluene, xylene, Cellosolve, Hi-Flash naphtha, petroleum ethers, and the like.

The phosphorus compounds used to prepare the compounds of this invention can be represented by the general formulas:

Phosphorous acid esters:
(I) Triesters — P(XR)$_3$; (II) Alkali metal diesters — MXP(XR)$_2$;
Phosphonous acid esters:
(III) Diesters — RP(XR)$_2$.

The compounds represented by Formula II are in equilibrium with compounds of the formula:

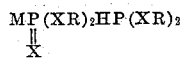

The symbols used in the above formula are defined as follows: P represents the phosphorus atom; X represents a non-metallic element of group VI-B of the periodic table of the elements consisting of oxygen, sulfur, selenium and tellurium; M represents an alkali metal and R represents an organic radical. R may be a saturated or unsaturated essentially hydrocarbon radical selected from the group consisting of the alkyl, aryl, aralkyl, cycloalkyl and alkenyl radicals. By the term "essentially hydrocarbon radical" is meant an unsaturated hydrocarbon radical or a hydrocarbon radical substituted to a minor extent by inert substituents which do not alter the hydrocarbon characteristics of the radical. Preferably the symbol R represents an alkyl or aryl radical containing from one to twelve carbon atoms, and still more preferably containing from one to six carbon atoms.

The phosphorus compounds used to prepare the compounds of the invention are the neutral esters of a polybasic oxy-acid of trivalent phosphorus. As the phosphorus ester there may be employed a trialkyl phosphite, wherein the alkyl groups may be the same or dissimilar, the ester containing preferably from one to twelve carbon atoms in each of the alkyl groups. Suitable trialkyl phosphites which may be employed include, among others, trimethyl phosphite, triethyl phosphite, triisopropyl phosphite, tributyl phosphite, tri-n-propyl phosphite, tri-2-ethylhexyl phosphite, trinonyl phosphite, and tridodecyl phosphite. Instead of a trialkyl phosphite there may be employed diesters of phosphonous acids. Among these are dialkyl arylphosphonites, such as dibutyl benzenephosphonite and dipropyl benzenephosphonite, and dialkyl alkanephosphonities, such as dibutyl butanephosphonite and diethyl ethanephosphonite. An additional group of phosphorus esters are the alkali metal salts of acid diesters of phosphorous acid—e. g., alkali metal dialkyl phosphites. Examples of this group are: sodium diethyl phosphite, potassium diethyl phosphite, sodium dibutyl phosphite, potassium ethyl butyl phosphite, sodium dipropyl phosphite and sodium propyl butyl phosphite.

Other compounds which may be employed as the phosphorus ester include: triaryl phosphites, such as triphenyl phosphite and dialkyl aryl phosphites, such as dibutyl phenyl phosphite; diethyl phenyl phosphite and dipentyl phenyl phosphite; alkenyl phosphites and phosphonites, such as triallyl phosphite, dimethallyl benzenephosphonite, diallyl butyl phosphite, dibutyl allyl phosphite and diallyl ethanephosphonite; aralkyl phosphites and phosphonites, such as bibutyl benzyl phosphite, tribenzyl phosphite, dibenzyl benzenephosphonite and diphenyl benzyl phosphite; cycloalkyl phosphites and phosphonites, such as di(cyclohexyl) ethanephosphonite, dibutyl cyclopentanephosphonite, dibutyl cyclohexyl phosphite and di(cyclohexyl) benzenephosphonite; and their homologs and analogs.

Diester hydrogen phosphites of the general formula HXP(XR)$_2$ are used, but they must first be converted to the alkali metal salt. Such is accomplished by reacting the appropriate diester hydrogen phosphite with sodium metal in an inert solvent.

The waxy materials from which the halogenated wax is derived are petroleum hydrocarbon waxes which have a melting point of at least 22° C. and which are substantially non-aromatic in character. In general, they are mixtures of long-chain hydrocarbons having from 14 to 44 carbon atoms in the principal chain. Their maximum melting point is about 82–90° C.

Waxes which can be halogenated and used to form the products of the invention include: slop waxes, sweat waxes, slush waxes, scale waxes, paraffin residues, refined paraffin waxes, micro-crystalline waxes, short residue waxes, rod waxes, foots oil, paraffin wax ceresins, petrolatum jellies and waxes, petroleum ceresins and synthetic hydrocarbon waxes. The preferred members of this group consist of scale waxes, paraffin residues and refined paraffin waxes.

The halowaxes which are used to form the compounds of the invention are those waxes above which have been halogenated by methods well known in the art. The halogenation of these waxes should continue until the halogen content is within the range of about 20% by weight to about 85% by weight. In general, the preferred halogenating agent is gaseous chlorine, and chlorination may be obtained by passing gaseous chlorine through the wax at just above its melting point, with or without the aid of catalyst. After chlorination it is preferable to blow the chlorinated wax with an inert gas such as nitrogen and the like. Instead of chlorinating the waxes, they can be fluorinated, brominated, or the wax can be halogenated in such a manner as to contain dissimilar halogen atoms in the molecule. In all cases the halogen content of the halowax should be above 20% by weight for the purposes of the present invention, and a preferred range is from about 25% to about 75% halogen content by weight.

Chlorinated waxes which are particularly suitable for the purpose of producing the compounds of the present invention can be obtained commercially. Some of these products are:

Chlorinated paraffin wax having a chlorine content of from about 41 to about 44% by weight. This material is a light amber viscous liquid having a specific gravity of from 1.16 to 1.17 at 25° C. and a viscosity of from about 22.5 to about 31.5 poises at 25° C.

Chlorinated paraffin wax having a chlorine content of from about 68% to about 72% by weight. This material is a light yellow solid with a softening point of from about 90° C. to about 100° C. Its specific gravity at 25° C. is from 1.60 to 1.70. The molecular weight is approximately 1060 and the refractive index usually is about 1.5347 at 25° C.

The halogen-substituted rubbers which are used to form the products of the invention are compounds which are known in the art as halorubbers. They are products of the halogenation of natural and synthetic rubbers, according to the following general equation:

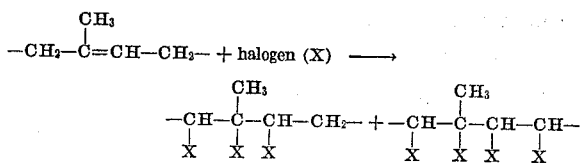

The halorubbers suitable for use in forming the claimed products should have a halogen content of from about 20% by weight to about 85% by weight. A preferred range is from about 50% to about 70% halogen content by weight. A commercial product widely available and quite suitable—in fact preferable—in the production of the compounds of the invention is a chlorinated rubber containing approximately 67% chlorine by weight. This material has a specific gravity of 1.64 at 20° C., an index of refraction of 1.554 at 20° C.

Such rubbers are prepared by halogenation in much the same manner as are halowaxes, the manner of preparation being described above.

Rubbers halogenated with bromine, iodine or fluorine are also suitable for producing the compounds of the invention, but chlorinated rubbers are preferable because of their wide availability.

The following examples are illustrative of some aspects of the invention. It is to be understood that the examples are for the purpose of illustration only and that the invention is not to be regarded as limited to any of the specific conditions cited therein. (Unless otherwise specified, the amount of each compound reacted or prepared is expressed in the examples as parts by weight.)

*Example I*

A polychloro-polyphosphono-paraffin wax was prepared by the following procedure: a solution of sodium dibutyl phosphite was prepared by dissolving 19 grams (0.82 mole) of sodium in 194 grams (1.0 mole) of dibutyl hydrogen phosphite in 1000 cubic centimeters of toluene. To this solution, at 105–112° C., was added 236 grams (containing 2.0 gram-atoms of chlorine) of a commercial chlorinated paraffin wax containing 30% chlorine by weight. This mixture was refluxed for 24 hours, after which time the mixture was cooled to room temperature. An equal weight of warm water was added to dissolve the sodium chloride which had separated from the reaction theatre; the mixture was then agitated gently, allowed to separate into two liquid layers, and the aqueous layer discarded. This washing procedure was repeated twice more. The toluene was removed by flash distillation. The crude product was then refluxed for 2 hours with an equal weight of 1.0 N sodium hydroxide solution. The final product weighed 256 grams, and on analysis proved to contain 19.1% chlorine and 4.16% phosphorus.

*Example II*

A product quite similar to that produced by the process described in Example I may be prepared by the following procedure: dissolve 250 grams (1.0 mole) of tributyl phosphite in 2000 cc. dry toluene, heat to 105° C., add slowly and with agitation 101.5 grams (the equivalent of 2.0 gram-atoms of chlorine) of a commercial chlorinated wax containing about 70% by weight chlorine. Reflux this mixture for approximately 48 hours, removing butyl chloride as formed. Distill the reaction mixture. Toluene will distill at 110.6° C., the butyl chloride remaining will distill within the range 68–80° C. (the butyl chlorides formed being both the normal and secondary forms). The desired product remains in the bottoms of the distillation, since its boiling point is much higher than that of the other reaction products. The crude reaction product is purified by refluxing with sodium hydroxide solution as described in Example I.

*Example III*

A polychloro-polyphosphono-rubber is produced by the following procedure: a solution of sodium dibutyl phosphite is prepared by dissolving 46 grams (2.0 moles) of sodium in 388 grams (2.0 moles) of dibutyl phosphite in 3000 cc. of dry toluene. Heat to 105–110° C. and add slowly 105 grams (the equivalent to two gram-atoms of chlorine) of a commercial chlorinated rubber containing approximately 67% chlorine. The mixture is refluxed for 48 hours, after which it is cooled, washed and purified by the same procedure described in Example I.

A similar product is prepared by substituting for the sodium dibutyl phosphite an equivalent amount of sodium diethyl phosphite.

*Example IV*

To prepare a polychloro-polyphosphinico-rubber, add 250 grams (1.0 mole) of dibutyl butanephosphonite to 2200 cc. dry toluene. Heat to 105–110° C. and add slowly and with vigorous agitation 79 grams (approximately the equivalent of 1.5 gram-atoms of chlorine) of the halorubber identified in Example III. Reflux at 105–108° C. for approximately 54 hours, removing butyl chloride as formed. Distill the mixture. The toluene is removed at 110.6° C., leaving the desired product as the bottoms of the distillation. The product may be purified by refluxing for two hours with an equal weight of 1.0 N sodium hydroxide solution, followed by separation of the two phases.

The high molecular weight polyhalogeno-polyphosphono- and polyhalogeno-polyphosphinico-hydrocarbons of the invention vary from viscous liquids through all degrees of elastic solids to hard, dense solids. Their physical and chemical characteristics make them useful as additives to improve the lubricating characteristics of lubricants of the petroleum based variety as well as synthetic lubricants, such as the synthetic ester lubricants, polyethers, and the like. They also are extremely useful as additives to paints, for they improve the wearing characteristics and increase the fire resistance of the paint to which they are added. The products of the invention also are useful in and of themselves as insecticides and as intermediates in the preparation of other insecticides.

We claim as our invention:

1. A process for producing a hydrocarbon compound containing a plurality of halogen atoms, together with phosphorus, which process comprises heating together in solution (1) a member of the group consisting of the neutral alkyl esters of phosphorous acid, the alkali metal salts of alkyl esters of phosphorous acid and the neutral alkyl esters of phosphonous acid, and (2) a polyhalogenated linear hydrocarbon compound containing at least 20% by weight of halogen, said halogenated compound being selected from the group consisting of (a) the product of the reaction of a halogen and a petroleum hydrocarbon wax, said wax having a melting point of at least 22° C. and being a long chain saturated aliphatic hydrocarbon containing from 14 to 44 carbon atoms per molecule, and (b) chlorinated rubber.

2. A process as in claim 1 wherein the heating is accomplished at a temperature of 50° C. to 150° C. and the initial reaction mixture contains from about 0.5 to about 5.0 moles of the phosphorus compound per mole of halogen present.

3. A substituted hydrocarbon comprising a member of the group consisting of rubber and petroleum waxes, said waxes having a melting point of at least 22° C. and being a long chain saturated aliphatic hydrocarbon containing from 14 to 44 carbon atoms per molecule, substituted with a plurality of halogen atoms and a plurality of members of the group consisting of dialkyl phosphono and dialkyl phosphinico radicals, these being the only substituent groups, said substituted hydrocarbon having a content of halogen within the range of from about 10% to 50% by weight and a content of phosphorus within the range of from about 1% to about 10% by weight.

References Cited in the file of this patent

UNITED STATES PATENTS 2,205,337   Berger ---------------- June 18, 1940